J. F. VAN WICKEL.
PLOW.
APPLICATION FILED NOV. 20, 1915.
1,207,686.
Patented Dec. 5, 1916.
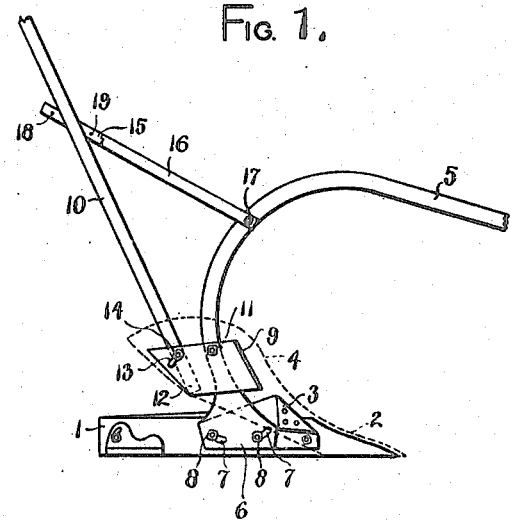
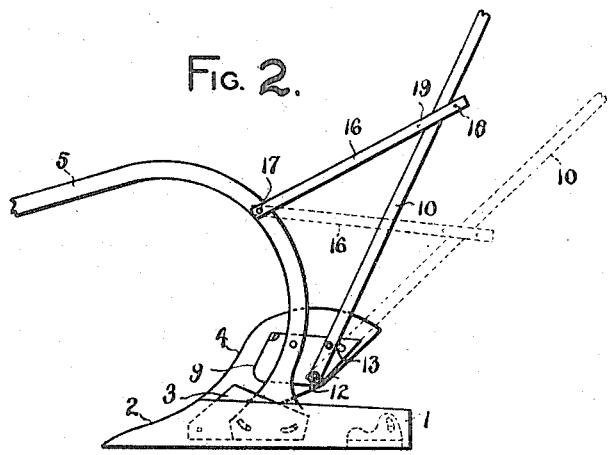
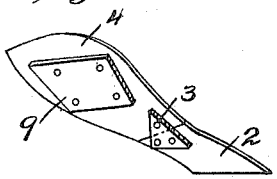
INVENTOR
Jesse F. Van Wickel
BY
Emery Booth Janney and Varney
his ATTORNEYS

UNITED STATES PATENT OFFICE.

JESSE F. VAN WICKEL, OF NEW YORK, N. Y., ASSIGNOR TO PACIFIC COMMERCIAL COMPANY, OF MANILA, PHILIPPINE ISLANDS, A CORPORATION OF PHILIPPINE ISLANDS.

PLOW.

1,207,686.  Specification of Letters Patent.  Patented Dec. 5, 1916.

Application filed November 20, 1915. Serial No. 62,445.

*To all whom it may concern:*

Be it known that I, JESSE F. VAN WICKEL, a citizen of the United States, residing in the borough of Brooklyn of the city of New York, Kings county, State of New York, have invented an Improvement in Plows, of which the following is a specification.

The object of this invention is to provide a plow in which certain adjustments may readily be effected to meet various conditions of use. Thus, in parts of the Philippine Islands the ordinary adjustment for depth of furrow which is afforded by the well known clevis is not sufficient to meet conditions there encountered. Accordingly, it is contemplated that by the use of my improved plow the depth of furrow may be more broadly varied to accommodate different crops and the plow be adapted to the pulling power of different animals. Likewise, circumstances sometimes require that the plow handle be adjustable so that it may be manipulated at various distances above the ground. Where the natives are of small stature, the plow handle, as commonly adjusted, is too high to be effectively used. And where the plowing is to be done under water, as is the case in rice culture, the handle should be elevated above the ordinary height for dry plowing.

One embodiment of my invention as applied to a plow is illustrated in the drawings which accompany this specification, and in which—

Figure 1 is a side view of a plow with the moldboard indicated in outline to show clearly the position of the moldboard relative to the handle and beam adjusting construction underneath the same, and Fig. 2 is a side view showing the reverse of the plow illustrated in Fig. 1, and indicating in dotted lines an adjustment of the plow handle. Fig. 3 shows the plow share and mold board together with wings of the V-shaped braces attached thereto.

Referring to Fig. 1 of the drawings, my invention may conveniently be embodied in a plow having a landside 1 to which is ordinarily attached a share 2 by suitable fastening means, including in the present case, a lower reinforcing member 3 of substantially V-shaped cross sectional contour, one side being secured to the landside while the other portion is fastened to the share by means of rivets or any other suitable fastening means to provide a substantial reinforcing member or brace for the wing of the share. This lower part 3 also provides a means of connecting the landside 1 with the lower end of a moldboard 4.

One of the important features of my improved plow is an adjustable beam 5 having a relatively flattened portion 6 at its rear end, the said flattened portion being adapted to engage the landside 1 and to be fastened thereto when the plow is in use. To adjust this beam, I have provided slots 7 in the flattened portion 6 thereof, the said slots being adapted to engage corresponding lugs 8 suitably fastened to the landside 1, and provided with threads to receive nuts for tightening or fastening the beam at any desired position.

To further strengthen the structure, and to more readily permit the adjustment hereinbefore described, I provide an upper reinforcing member or brace 9 of V-shaped cross sectional contour, and having one portion fixed to the moldboard 4, the remaining portion, clearly shown in both Figs. 1 and 2 being adapted to engage the beam 5 and to support a suitable plow handle 10. The beam 5 is preferably attached to the reinforcing member or brace 9 to permit pivotal motion around a bolt 11, which is threaded to receive a nut for clamping the beam in operative position and in secure engagement with the brace plate 9. Thus, by slackening the nuts at 11 and 8, the beam 5 may be moved relatively to the landside 1 for the purpose above indicated and may then be fastened by again tightening up on the said nuts.

Another feature of my invention is the structure by which the handle 10 may be adjusted to meet various conditions of use. In the present embodiment, I have shown the handle 10 pivotally mounted on the plate 9 at 12 by means of a bolt or other suitable connection. The plate 9 is provided with a slot 13 adapted to receive a bolt 14 which projects from the handle 10 and which is provided with a threaded portion and a coöperating nut by means of which the handle may be fastened in any desired position along the arc of the slot 13.

The handle 10 is preferably disposed in the same longitudinal plane with the beam 5 so that a slight deflection to one side or the other of the handle will readily guide the course of the plow. I have further provided suitable means for bracing the handle and the beam, said means being shown in the drawings as a pair of bars 15 and 16. The bar 16 is broken away in Fig. 1 to show the bar 15 lying behind it and passing across the rear side of the handle 10. The bracing bars are fastened to the beam 5 by means of a suitable pivotal connection as a bolt 17, and are retained in operative position upon the handle 10 by means of bolts, 18 and 19, one being arranged at either side of the handle. In order to alter the position of the handle 10 as indicated in Fig. 2, the nuts threaded upon said fastening bolts may be slackened, whereupon the handle may be depressed to the position indicated in dotted lines. To again fasten the handle so that the plow can be operated, the nuts are tightened, both between the handle and the plate 9 and between the handle and the braces 15 and 16.

It has been found that the plow which I have described hereinabove is admirably adapted to meet various agricultural needs arising in the Philippine Islands some of which have been mentioned. Adjustability of the beam with respect to the landside to regulate the depth of furrow is accomplished in my improved structure and is advantageous in that this adjustment is made without unduly expanding the lever function of the clevis. Thus, from the foregoing, it will be clear that important advantages concerning the actual turning of the soil are gained by providing a beam which may be adjusted with respect to the landside and that the adjustment of the plow handle also constitutes an important improvement in that one plow is thus made available for use by persons of different stature and for use under a wide variety of conditions.

I claim as my invention:

1. In a plow, the combination of a land side, a share, a lower V-shaped brace interposed between said land side and said share and having interiorly projecting lugs on one wing, a mold board, an upper V-shaped brace having one wing attached to said mold board, a draft beam pivotally mounted on the other wing of said upper brace and having slotted openings at its lower end to engage the lugs projecting from the lower brace, whereby said beam may be held in contact therewith, said beam being adjustable in a plane lying between the planes of the beam engaging wings of said braces, and means for fastening said beam securely to said braces.

2. In a plow, the combination of a land side, a share, a V-shaped brace having one wing attached to said share and the other wing provided with a slot, a plow handle pivotally attached at one end to the latter wing below said slot and having a lug adapted to engage said slot, means for fastening the lug in any desired position along the slot, and handle bracing means interposed between said beam and the handle.

3. In a plow, the combination of a land side, a share, a V-shaped brace having one wing attached to said share and a free wing, a beam pivotally mounted on said free wing, a plow handle adapted to be supported by and fastened at two points to said free wing in the longitudinal plane of said beam whereby the handle is held rigidly in said longitudinal plane, and handle bracing means interposed between said beam and the handle.

4. In a plow, the combination of a land side, a share, a V-shaped brace having one wing attached to said share and a free wing, a beam pivotally mounted on said free wing, a plow handle disposed in the plane of said beam and attachable to the free wing at two points, handle bracing means pivoted at one end to the beam and slidably embracing said handle at the other end, and means for fastening said handle bracing means in secure operative relation to said handle and to said beam.

In testimony whereof, I have signed my name to this specification this 18th day of November, 1915.

JESSE F. VAN WICKEL.

Copies of this patent may be obtained for five cents each, by addressing the "Commissioner of Patents, Washington, D. C."